Dec. 3, 1935.  M. BRODART  2,023,304

TRACTOR WHEEL

Filed June 1, 1934

Inventor:
Marcel Brodart
By
Attorney

Patented Dec. 3, 1935

2,023,304

UNITED STATES PATENT OFFICE 2,023,304

TRACTOR WHEEL

Marcel Brodart, Agen, France

Application June 1, 1934, Serial No. 728,599
In France June 20, 1933

3 Claims. (Cl. 301—41)

The present invention relates to tractor wheels provided at their periphery with flat wings or cleats, whose planes are parallel to the axle, or oblique to the latter, and which serve to increase the traction between the wheel and the ground by penetrating into the ground.

However, when the tractor travels upon a moist and argillaceous soil, the earth clogs up the spaces between the cleats so that the said cleats can no longer enter the ground, thereby reducing the effect of the cleats.

By the present invention, it is proposed to prevent the earth, however adhesive it may be, from thus remaining between the cleats, and for this purpose, each space between two consecutive cleats, contains a plate mounted between two rings which surround the wheel and whose diameter is greater than the wheel diameter.

During the travel, the wheel and the rings are tangent to the point of contact with the ground, and as they continue to turn, the plates become separated from the wheel, thus clearing the spaces between the cleats of the earth which would have otherwise accumulated therein.

A form of construction of the device in conformity with the invention is represented by way of example in the accompanying drawing.

Figure 1:
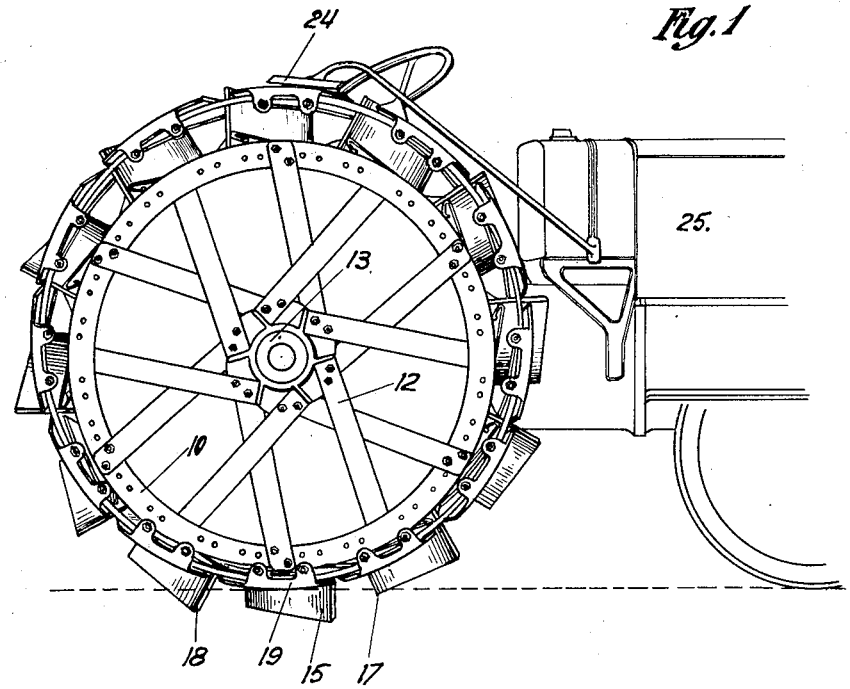
Fig. 1 shows a front view of a tractor wheel provided with the device of the present invention.
Figure 3:
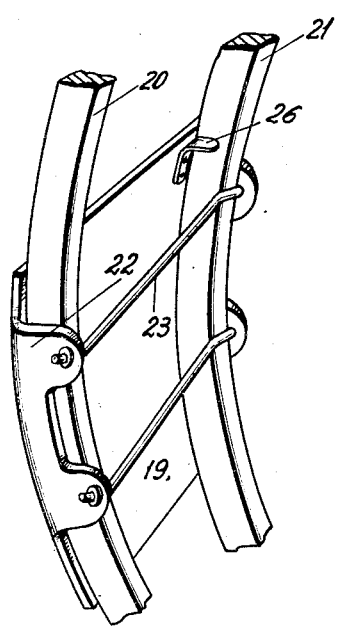
Fig. 3 shows one of the intermediate plates mounted on its supporting rings.
Figure 2:
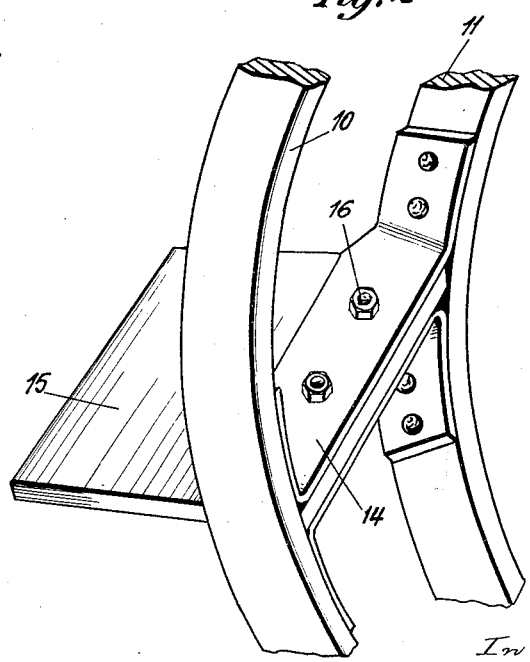
Fig. 2 is a view on a larger scale, showing cleats associated with a tractor wheel.

The wheel of the tractor shown in Figs. 1 and 2 consists simply of two rims 10 and 11, connected by spokes 12 with a hub 13.

The said rims are connected together by cross-pieces 14, and as usual, the wheel is completed by flat cleats 15, which are secured for instance to the cross-pieces by bolts 16.

Fig. 1 shows that the plane of each cleat is not parallel to the axis of the hub 13, but is oblique to this axis, and thus the plates will act upon the ground at one angle, as shown at 17, and will leave the ground at another angle such as 18. This construction will reduce the risk of earth adhering to the cleats.

However, in order to entirely eliminate such risks, even in the case of very argillaceous and adhesive earth, the invention comprises the mounting, in each space between two consecutive cleats 15, of a plate 19 secured to two rings 20 and 21 and having a diameter greater than that of the rims 10 or 11. The difference between these diameters should be equal to the height of the cleats 15.

The plates 19 can be mounted on the rings 20 and 21 in any suitable manner, and in particular, they may be riveted or bolted to said rings. However, according to the preferred form of construction represented in the drawing, the plates 19 are provided with lateral lugs such as 22 which are connected together by rods 23 whose function is simply to hold the rings 20 and 21, while permitting the said rings to slide upon the plates.

The displacement of the rings 20 and 21 towards each other is prevented by stops 26 mounted on the plates 19.

The provision for slipping of the rings 20 and 21 with reference to the said plates, assures a great flexibility of operating, for it has been observed in practice that the rings 20 and 21 have a tendency to turn at a slower rate than the rims 10 and 11, and thus with reference to the said rims, the rings have a movement in the contrary direction.

The operation of the device according to the invention is readily understood with reference to Fig. 1. At the point of contact with the ground, the plate 19 and the rims 10 and 11 will obviously bear upon one another, but as the diameter of the rings 20 and 21 is greater than that of the rims, it is evident that the plate 19, which is in a position diametrically opposite the point of contact with the ground, will be separated from the rims 10 and 11 to the maximum degree, and will attain the level of the outer edge of the cleats 15.

In this manner, when the wheel turns, the plates will be radially displaced with reference to the cleats 15, and will thus continually free the spaces between the cleats, of all earth which may have become lodged therein.

A scraper 24 secured to the chassis of the tractor 25, is mounted at the top of the wheel in order to remove any earth which may adhere to the plates 19, and thus when each cleat acts upon the ground at 17, it is entirely free from earth, and has its maximum efficiency.

The improvements in conformity with the present invention are applicable to all wheels for tractors, having cleats either oblique or parallel to the axle, irrespectively of the manner in which the spokes of the wheel are mounted, but provided that the spaces between the cleats are open, in order to prevent the earth from accumulating between the plate 19 and the wheel.

I claim:

1. In combination, a tractor wheel, a plurality of cleats on the periphery of the wheel, plates loosely positioned between adjacent cleats, a pair of rings surrounding the wheel and having a greater diameter than the wheel, and means loosely attaching the plates to the outer periphery of the rings to provide for circumferential sliding of the plates relative to the rings, said means including lugs carried by the plates and rods radially inwardly of the rings connecting the lugs so that the plates and rods embrace the rings.

2. A tractor wheel comprising a rim, a plurality of circumferentially spaced cleats on the periphery of the rim, a ring of greater diameter than the rim positioned on each side of the rim, a plurality of plates, means for loosely and circumferentially slidably mounting said plates on said rings, each of said plates being loosely positioned between two adjacent cleats for radial movement therebetween, said means including lugs carried by the plates and rods connecting the lugs so that the plates and rods embrace the rings.

3. A tractor wheel comprising a rim, a plurality of circumferentially spaced cleats on the periphery of the rim, a ring of greater diameter than the rim positioned on each side of the rim, a plurality of plates, means for loosely and circumferentially slidably mounting said plates on said rings, each of said plates being loosely positioned between two adjacent cleats for radial movement therebetween, said means including lugs carried by the plates and rods connecting the lugs so that the plates and rods embrace the rings, and means on the plates for maintaining the rings in predetermined axial spaced relation.

MARCEL BRODART.